United States Patent

[11] 3,555,322

| [72] | Inventors | Voldemar Voldemarovich Apsit<br>Ul V. Latsisa, 2a, kv. 21, and<br>Viktor Alexeevich Sushkevich, ul. Dzelzavas,<br>15/1, kv. 55, Riga, U.S.S.R. |
|---|---|---|
| [21] | Appl. No. | 720,623 |
| [22] | Filed | Apr. 11, 1968 |
| [45] | Patented | Jan. 12, 1971 |

[54] NONCONTACT ROTARY CONVERTER
1 Claim, 1 Drawing Fig.

[52] U.S. Cl. ............................................ 310/113,
310/163, 310/263
[51] Int. Cl. .................................................. H02k 47/14
[50] Field of Search ......................................... 310/163,
161, 67, 160, 68, 162, 68.4, 126, 170, 113, 112,
114, 263, 101, 102, 59; 321/63; 318/165

[56] References Cited
UNITED STATES PATENTS

| 2,477,423 | 7/1949 | Schweitzer .................. | 310/112 |
| 2,633,545 | 3/1953 | Rieth ........................... | 310/113 |
| 2,748,342 | 5/1956 | VanKaick ..................... | 310/113 |
| 2,836,741 | 5/1958 | Falck ........................... | 310/113 |
| 3,334,283 | 8/1967 | Hugot .......................... | 318/165 |
| 2,023,245 | 12/1935 | Schou .......................... | 310/160 |
| 3,197,660 | 7/1965 | Leischner ..................... | 310/112 |
| 3,423,619 | 1/1969 | Shaw ........................... | 310/263 |

FOREIGN PATENTS

| 578,934 | 7/1946 | Great Britain ................. | 310/113 |
| 1,069,394 | 11/1955 | France ......................... | 310/160 |
| 148,847 | 0/1962 | U.S.S.R. ....................... | 321/63 |

*Primary Examiner*—Milton O. Hirshfield
*Assistant Examiner*—R. Skudy
*Attorney*—Waters, Roditi, Schwartz & Nissen ABSTRACT: A noncontact rotary converter wherein a synchronous motor with claw-shaped poles and an inductor generator are mounted in a common ferromagnetic frame and on a common shaft and both have a common magnetic system with a common magnetic flux. The claw-shaped poles are mounted in the middle of the rotor of the motor and the end portions of the rotor are inductors with the same polarity as the claw-shaped poles. A stator cooperates with the claw-shaped poles and serves as the motor stator and two further stators cooperate with the inductors in the generator.

PATENTED JAN 12 1971
3,555,322
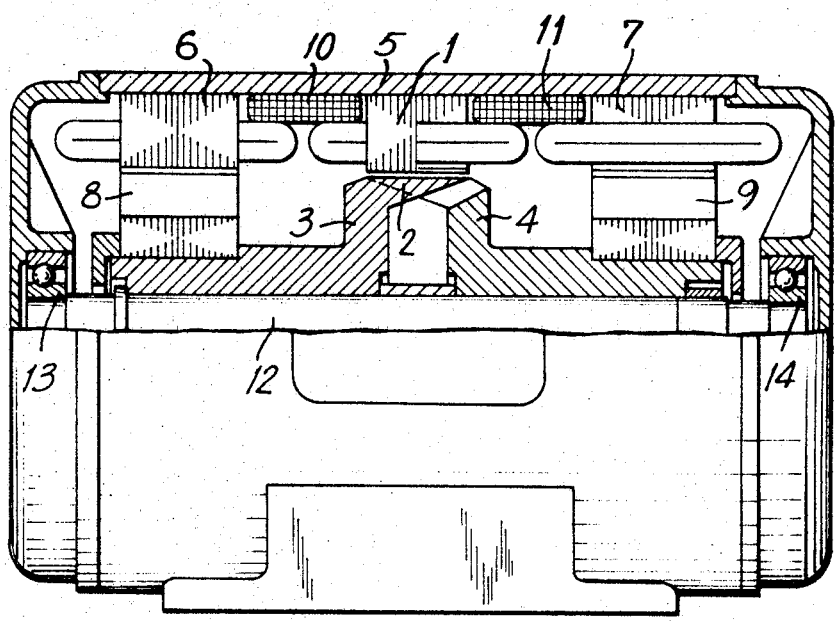

NONCONTACT ROTARY CONVERTER

The present invention relates to rotary AC converters employed, for example, for converting three-phase industrial frequency current into multiphase or single-phase current of higher frequency which is used as a supply source for arc welding, portable electric tools, high-speed AC electric motors etc.

Known converters are essentially a combination of a synchronous motor and an AC inductor generator both accommodated in a common frame and mounted on a common shaft, but featuring separate magnetic systems.

The disadvantages of said converters are their large dimensions and weight.

The primary object of the present invention is to eliminate the above-mentioned disadvantages.

A specific object of the present invention is to provide a converter of smaller size and weight.

These objects are accomplished by the fact that the noncontact rotary converter is provided with a common magnetic system and a common magnetic flux both for the motor and generator.

The common magnetic system may be made up of a common rotor without a winding and three stator cores with separate windings, the middle of said three cores serving as a motor stator, whereas the extreme cores serve as stators of the inductor generator, the middle portion of the rotor being provided with claw-shaped poles and the extreme portions of the rotor being essentially star-shaped single-pole inductors.

The invention will be described hereinbelow by way of an exemplary embodiment thereof with due reference to the accompanying drawing which shows in section the noncontact rotary converter employing a synchronous drive according to the invention. The motor part of the converter (as can be seen from the drawing) is made as a noncontact synchronous motor with a stator 1 provided with a three-phase winding, a rotor 2 with claw-shaped poles 3 and 4, and an external magnetic frame or yoke 5.

The generator part of the converter consists of two stators 6 and 7 of the inductor generator arranged on both sides of the stator 1 of the synchronous motor and provided with a magnetic circuit which is common to said motor, and inductors 8 and 9.

The field winding consists of two round coils 10 and 11, and is likewise common to both the motor and generator and is fixed in position on the inner surface of the magnetic yoke 5.

The rotor 2 of the converter has no windings and is located on a common shaft 12 which runs in two bearings 13 and 14.

The noncontact rotary converter is actuated as follows. The three-phase winding of the stator 1 of the synchronous motor is connected directly to industrial frequency three-phase supply mains. The rotor 2 is brought up to the synchronous speed without any auxiliary means and the voltage is then applied to the coils 10 and 11. A field magnetic flux appears which is closed through the stator 6, the teeth of the inductor 8, the poles 3, the stator 1, the poles 4, the teeth of inductor 9, the stator 7 and further along the external magnetic yoke 5. Along with this, the claw-shaped poles 3 and 4 of the synchronous motor acquire an alternate polarity and the star-shaped portions of the rotor form two inductors 8 and 9 with the like poles, said inductors being capable of inducing a variable e.m.f. of higher frequency in the single-phase stators 6 and 7 of each welding generator. The windings of the stators 6 and 7 depending upon the welding requirements may be connected either in series or in parallel.

The noncontact rotary converter is stopped by disconnecting the stator winding from the motor supply mains.

The advantages of the noncontact rotary converter are as follows: high frequency stability of the generator output voltage which is equal to the frequency stability of the supply mains; a possibility to operate with any power factor (even in cases when said power factor equals unity or becomes a capacitance current); sufficiently small sizes and weight; high reliability in operation; the care required is a minimum amounting to periodic lubrication of the bearings.

We claim:

1. A noncontact rotary converter comprising a ferromagnetic frame, at least three stator cores carried by said frame, a polyphase armature winding on the middle of said cores serving as a stator of a synchronous motor of said converter, at least tow polyphase armature windings on the end cores serving as stators of inductor generators of said converter, at least two stationary field coils between said middle and end cores, a shaft accommodated in said frame, a common rotor for said motor and generators located on said shaft, said common rotor including a middle portion provided with claw-shaped poles and end portions constituted as inductors with respective pole pieces being provided with a common magnetic flux for said motor and said generators.